United States Patent [19]

Masemore

[11] Patent Number: 5,724,559
[45] Date of Patent: Mar. 3, 1998

[54] METHOD FOR DISPLAYING ISPF PANELS IN A VM NON-ISPF ENVIRONMENT

[75] Inventor: Terry Lyn Masemore, Thurmont, Md.

[73] Assignee: International Business Machines Corporation, Armonk, N.Y.

[21] Appl. No.: 611,436

[22] Filed: Mar. 4, 1996

Related U.S. Application Data

[63] Continuation of Ser. No. 142,024, Oct. 28, 1993, abandoned.

[51] Int. Cl.$^6$ .................................................. G06F 9/455
[52] U.S. Cl. .................................................. 395/500
[58] Field of Search .................................................. 395/500

[56] References Cited

U.S. PATENT DOCUMENTS

| | | | |
|---|---|---|---|
| 4,821,211 | 4/1989 | Torres | 395/156 |
| 4,845,644 | 7/1989 | Anthias et al. | 395/157 |
| 4,926,349 | 5/1990 | Thor | 395/156 |
| 5,083,262 | 1/1992 | Haff, Jr. | 395/500 |
| 5,274,821 | 12/1993 | Rouquie | 395/700 |
| 5,349,657 | 9/1994 | Lee | 395/650 |
| 5,390,314 | 2/1995 | Swanson | 395/500 |
| 5,416,903 | 5/1995 | Malcolm | 395/155 |

*Primary Examiner*—Kevin A. Kriess
*Assistant Examiner*—John Q. Chavis
*Attorney, Agent, or Firm*—William A. Kinnaman, Jr.

[57] ABSTRACT

A method for displaying panels from an ISPF panel library using an XEDIT macro written with the REXX language under a virtual machine operating system is disclosed. Interactive System Productivity Facility capabilities are imparted to a non-ISPF operating system. The method allows a software application to easily except an ISPF panel library using standard components eliminating the need for a separate ISPF program product. Macro stemmed variables are utilized to construct within a REXX programming language so that the stemmed variable can be traversed using a counter for the 'Y' component only.

13 Claims, 8 Drawing Sheets

101 FILEDEF THE ISPF PANEL LIBRARY INPUT FILE, SPECIFYING MEMBER PANEL
102 FILEDEF THE OUPUT CMS FILE
103 EXECUTE MOVEFILE COMMAND
104 CHECK RETURN CODE AND ASSURE THE OUTPUT CMS FILE WAS CREATED

FIG.1

| SECTION | DESCRIPTION |
|---|---|
| ATTRIBUTE | CONTAINS A LIST OF SPECIAL CHARACTERS USED IN THE PANEL DEFINITION ALONG WITH DISPLAY CHARACTERISTICS ASSOCIATED WITH EACH SPECIAL CHARACTER. EXAMPLES OF DISPLAY ATTRIBUTES WOULD INCLUDE COLOR, INTENSITY, AND HIGHLIGHTING. |
| BODY | DEFINES THE DISPLAY IMAGE, LINE-BY-LINE, WITH EACH LINE OF THE BODY SECTION REPRESENTING AN ASSOCIATED LINE OF THE DISPLAY SCREEN. SPECIAL CHARACTERS FROM THE ATTRIBUTE SECTION ARE IMBEDDED WITHIN LINES OF THE BODY TO INDICATE THE DISPLAY CHARACTERISTICS OF THE DISPLAY CHARACTERS. |
| INIT | THE INITIALIZATION SECTION PROVIDES INFORMATION THAT IS REQUIRED BY THE APPLICATION BEFORE THE SCREEN IS DISPLAYED. FOR EXAMPLE, THIS SECTION WILL PROVIDE VALUES OF ANY SPECIAL VARIABLES USED IN THE PANEL (SUCH AS THE VARIABLE THAT TELLS THE APPLICATION WHAT RELATED HELP PANEL IS ASSOCIATED WITH THE CURRENT PANEL). |
| PROC | THE PROCESS SECTION PROVIDES PROCESSING STEPS THAT WILL BE PERFORMED WHEN THE USER PRESSES A KEY ON THEIR KEYBOARD AFTER THE PANEL IS DISPLAYED. FOR EXAMPLE, IT MAY DEFINE A SET OF COMMANDS THAT ARE ASSOCIATED WITH CERTAIN KEYS ON THE KEYBOARD. THE APPROPRIATE COMMAND WILL BE EXECUTED, DEPENDING ON WHICH KEY THE USER PRESSES. |

FIG.2

```
)ATTR
 $ TYPE(INPUT) INTENS(HIGH) COLOR(RED) CAPS(OFF) PAD('_')
 + TYPE(TEXT) INTENS(LOW) COLOR(GREEN) CAPS(OFF)
)BODY
 +-------------------------DATA ENTRY PANEL-------------------------
 +
 + ENTER FIRST NAME:    $FIRSTNAME    +
 +
 + ENTER MIDDLE INITIAL: $Z+
 +
 + ENTER LAST NAME:     $LASTNAME              +
 +-----------------------------------------------------------------
)INIT
 .ZVARS = (INITIAL)
 .HELP = NAMEHELP
 &ZPF01 = 'HELP'
)PROC
 &KEYHIT = .PFKEY
)END
```

FIG.3

```
      /* INITIALIZE FOUR LINE COUNTER VARIABLES */
401 SET FOUR COUNTERS TO 0 (ATTRIBUTE, BODY, INITILIZATION, PROCESS)

402 DO UNTIL ALL PANEL RECORDS HAVE BEEN READ    /* READ CMS FILE */
403   READ NEXT CMS FILE LINE
404   SELECT                           /* PERFORM ONE OF FOLLOWING */
405     WHEN LINE TYPE = 'ATTRIBUTE'
            INCREMENT ATTRIBUTE LINE COUNTER
            ASSIGN LINE TO ATTRIBUTE STEMMED VARIABLE
406     WHEN LINE TYPE = 'BODY'
            INCREMENT BODY LINE COUNTER
            ASSIGN LINE TO BODY STEMMED VARIABLE
407     WHEN LINE TYPE = 'INITIALIZATION'
            INCREMENT INITIALIZATION LINE COUNTER
            ASSIGN LINE TO INITIALIZATION STEMMED VARIABLE
408     WHEN LINE TYPE = 'PROCESS'
            INCREMENT PROCESS LINE COUNTER
            ASSIGN LINE TO PROCESS STEMMED VARIABLE
409   END SELECT
410 END DO UNTIL
```

FIG.4

```
501  DO i = 1 TO ATTRIBUTE_COUNTER    /* FOR EACH ATTRIBUTE LINE */
        /* PARSE THE LINE, GATHERING ISPF CODED ATTRIBUTE DEFINITION */
502     ATTRIBUTE_CHARACTER.i = FIRST_TOKEN    /* ISPF ATTRIBUTE CHARACTER */
503     ATTRIBUTE_TYPE.i = TYPE_DATA           /* ISPF ATTRIBUTE TYPE */
504     ATTRIBUTE_INTENSITY.i = INTENSITY_DATA    /*INTENSITY KEYWORD */
505     ATTRIBUTE_COLOR.i = COLOR_DATA         /* COLOR KEYWORD */
506     ATTRIBUTE_CASE.i = CASE_DATA           /* UPPER/LOWER CASE KEYWORD */
507     ATTRIBUTE_PAD.i = PADDING_DATA         /* ATTRIBUTE PAD CHARACTER */
508  END DO
```

FIG.5

```
601  ZVARS = 0
602   DO i = 1 TO INIT_COUNTER    /* FOR EACH INITIALIZATION LINE */
         /* PARSE THE LINE, GATHERING ISPF CODED INIT INFORMATION */
603      IF FIRST_TOKEN = '.ZVARS'         /* ISPF PANEL 'Z' VARIABLES */
            THEN DO
                    /* BREAK LINE AT LEFT PARENTHESIS */
604                 SPLITLINE INTO LEFTLINE '(' RIGHTLINE
                    /* NOW LOOP, BREAKING LINE AT COMMAS, GATHERING */
                    /* VARIABLE NAMES INTO A STEMMED VARIABLE       */
605                 DO UNTIL RIGHTLINE = '+' OR RIGHTLINE = ''
                       /* BREAK LINE AT COMMA */
606                    SPLITLINE INTO VARNAME ',' RIGHTLINE
607                    ZVARS = ZVARS + 1              /* INCREMENT COUNTER */
608                    ZVARIABLE.ZVARS = VARNAME   /* ASSIGN VARIABLE NAME */
                       /* A '+' AT THE END OF A LINE INDICATES THAT THE */
                       /*   STATEMENT IS CONTINUED ON THE NEXT LINE    */
609                    IF RIGHTLINE = '+'
610                       THEN RIGHTLINE = LINE (i + 1)
611                 END DO UNTIL
612              END THEN DO

613      IF FIRST_CHARACTER = '&'         /* ISPF PANEL VARIABLE */
614         THEN PROCESS_PANEL_VARIABLE
615  END DO i
```

FIG.6

```
701 DO i = 1 TO PROCESS_COUNTER    /* FOR EACH PROCESS SECTION LINE */
      /* PARSE THE LINE, GATHERING ISPF CODED INFORMATION */
702   IF FIRST_CHARACTER = '&'     /* ISPF VARIABLE */
703     THEN PROCESS_VARIABLE
704 END DO i
```

FIG.7

```
801 ZVAR_COUNTER = 0
802 DO i = 1 TO BODY_COUNTER       /* FOR EACH BODY SECTION LINE */
      /* SEARCH EACH LINE FOR ISPF ATTRIBUTE CHARACTERS */
803   DO j = 1 TO ATTRIBUTES       /* FOR EACH ATTRIBUTE CHARACTER */
        /* FIND POSITION OF ATTRIBUTE CHARACTER IN LINE */
804     LOCATION = FIND (ATTRIBUTE.j, LINE.i)
805     XEDIT_ATTRIBUTE = CONVERT (ATTRIBUTE.j)
806     DO WHILE LOCATION > 0      /* WHILE ATTRIBUTE FOUND IN LINE */
          /* SPLIT LINE INTO LEFT AND RIGHT HALVES AT ATTRIBUTE */
807       SPLITLINE INTO LEFTLINE LOCATION RIGHTLINE
          /* INSERT XEDIT FORMAT ATTRIBUTE AT END OF LEFTLINE */
808       LEFTLINE = LEFTLINE + XEDIT_ATTRIBUTE
          /* IF ATTRIBUTE TYPE IS INPUT OR OUTPUT, GET VARIABLE NAME */
809       IF ATTRIBUTE_TYPE.j = 'INPUT' OR 'OUTPUT'
810         THEN DO
              /* FIND LOCATION IN RIGHT HALF OF NEXT ATTRIBUTE */
811           LOCATION2 = FIND (ATTRIBUTE, RIGHTLINE)
              /* CALCULATE LENGTH OF VARIABLE NAME */
812           VARIABLE_LENGTH = LOCATION2 - LOCATION
              /* SPLIT RIGHT LINE AT ATTRIBUTE, GETTING VARIABLE */
813           SPLITRIGHTLINE INTO VARNAME LOCATION2 RIGHTLINE
              /* SUBSTITUTE REAL VARIABLE NAME IF 'Z' TYPE */
814           IF VARNAME = 'Z'
815             THEN DO
816               ZVAR_COUNTER = ZVAR_COUNTER + 1
817               VARNAME = ZVAR.ZVAR_COUNTER
818             END DO
              /* END CURRENT VALUE OF THE VARIABLE FROM XEDIT */
819           CURRENT_VALUE = VALUE(VARNAME)
              /* PAD VALUE USING ATTRIBUTE PAD CHARACTER */
820           CURRENT_VALUE = CURRENT_VALUE + PAD(ATTRIBUTE_PAD.j)
              /* NOW INSERT VARIABLE'S CURRENT VALUE INTO LINE */
821           LINE.i = LEFTLINE + VALUE(VARNAME) + RIGHTLINE
822         END DO
823     END DO WHILE
824   END DO j
825 END DO i
```

FIG.8

```
901 DO i = 1 TO BODY_COUNTER        /* FOR EACH BODY SECTION LINE */
902    'SET RESERVED' i 'NOH' LINE.i  /* XEDIT SCREEN FORMAT COMMAND */
903 END DO
904 COMMAND READ NOCHANGE TAG       /* XEDIT SCREEN DISPLAY AND WAIT */
905 PULL KEYTYPE LINE_NUMBER COLUMN_NUMBER VALUE
906 IF KEYTYPE = 'PFK'
907   THEN KEYHIT = 'PFKEY' LINE_NUMBER
908 IF KEYTYPE = 'ETK'
909   THEN KEYHIT = 'ENTER'
```

FIG.9

```
------------------ DATA ENTRY PANEL ------------------
  ENTER FIRST NAME :    ________

ENTER MIDDLE INTIIAL: _

ENTER LAST NAME:      ________
------------------------------------------------------
```

METHOD FOR DISPLAYING ISPF PANELS IN A VM NON-ISPF ENVIRONMENT

This application is a continuation of application Ser. No. 08/142,024, filed Oct. 28, 1993, now abandoned.

BACKGROUND OF THE INVENTION

1. Field of the Invention

This invention relates to computer terminal display panels and more particularly, for a method of producing computer display panels having interactive system productivity facility capabilities without having ISPF installed.

2. Background Art

Many interactive software applications within the IBM mainframe environment utilize IBM's "Interactive System Productivity Facility" (ISPF) software product to provide a menu-driven user interface (display panels). ISPF will run on all three of IBM's proprietary mainframe operating systems (MVS, VSE, VM), providing a level of application portability to all three environments. MVS, VSE, and VM are trademarks of IBM Corporation, Armonk, N.Y.

The development support components of ISPF are utilized by technical application software developers while an application is being developed or maintained. The runtime support components of ISPF are utilized by any number of users when the application is actually executed. A primary function of the runtime support is to access and display panels that were previously developed using the development support components of ISPF. When developed under ISPF, these panel definitions are stored in ISPF libraries that are normally only accessible using ISPF.

ISPF is highly used within MVS and VSE, but is less popular on the VM operating system due to the availability of alternative display management tools (XEDIT and REXX) which are included as basic components of VM (whereas ISPF is an optional product available only at additional cost).

This invention describes a method that can be used to display panels from an ISPF panel library using an XEDIT macro written with the REXX language under IBM's VM operating system. The described technique allows previously developed ISPF panels (which may belong to an application on MVS or VSE) to be displayed on VM using XEDIT, eliminating an application's need for the ISPF product when executing within the VM operating system environment.

The Interactive System Productivity Facility (ISPF) is an IBM software product that runs on IBM's three proprietary mainframe operating system platforms (MVS, VSE, and VM). The product provides several components used by an application developer to produce interactive applications which utilize menu-driven user interfaces (panels). The product is also required during application execution to display the panels that were previously developed using ISPF.

Due to the limited availability and usage of ISPF within the VM operating system environment, the portability of many MVS and VSE applications to VM is restricted by the ISPF prerequisite. This problem can be alleviated by providing a method that will convert and display panels from an application's ISPF panel library, without using the ISPF software product. The method uses basic components of the VM operating system (XEDIT and REXX) to display panels created by ISPF, eliminating the need for the ISPF product during application execution time.

SUMMARY OF THE INVENTION

A method is disclosed that allows a software application to easily access an ISPF panel library (MACLIB) using standard components of IBM's Virtual Machine (VM) operating system, eliminating the need for the separate ISPF Program Product. The ISPF panel library and ISPF message library may be utilized, without change, by an XEDIT macro, allowing a single panel library to be used by either ISPF or XEDIT as required.

The novel feature of this method is the ability to utilize existing ISPF panels without the Interactive System Productivity Facility product, which allows existing code to be reused, rather than requiring new code development for an environment without ISPF. The existing ISPF panels may be accessed and displayed directly from the ISPF panel library, without modification, during application execution time.

BRIEF DESCRIPTION OF THE DRAWINGS

FIG. 7 is a listing of an interrupt process section of an ISPF panel.

FIG. 8 is a listing of an interrupt body section of an ISPF panel.

FIGS. 11 a, b and c show a flow diagram of the process flow to implement the present invention.

DESCRIPTION OF THE PREFERRED EMBODIMENT

The disclosed method will access an ISPF panel library, retrieve individual panels specified by the invoking application, interpret the ISPF format panel definition, convert the panel into a form compatible with XEDIT, and display the panel interactively using XEDIT instead of the display management facility of ISPF.

The first step of the method will retrieve a specified individual panel definition from an ISPF format panel library (MACLIB) that contains all panels required by the application. ISPF uses a file format that originated with the MVS and VSE operating systems, consisting of a group of individually named "members" within a single file "library". The VM "MOVEFILE" command is used to extract a specified panel member from the ISPF panel library and export it to a format that is native to the VM operating system (CMS file).

Figure 1:
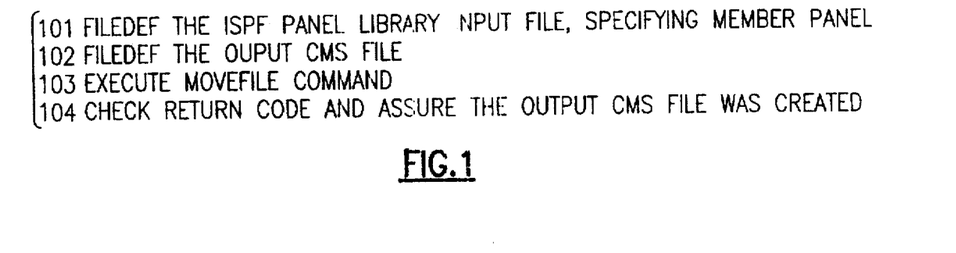
FIG. 1 is a listing of the pseudocode for an ISPF library.

The pseudocode of FIG. 1 performs the MOVEFILE function which will extract a specified panel member from an ISPF panel library and create a CMS file copy of the ISPF panel image.

The MOVEFILE command requires that the INPUT file and OUTPUT file be defined using the "FILEDEF" statement prior to MOVEFILE execution. Line 101 of FIG. 1 will define the specific member of the ISPF panel library that should be "moved" to an external CMS file format. Line 102 defines the output CMS file which will contain the panel image of the ISPF member when MOVEFILE executes. After performing the MOVEFILE command (line 103), the result of the operation must be tested (line 104) to assure that the output file was created properly. If the output file was not created (for example, the specified ISPF member did not exist in the panel library), an error message should be displayed and control should be passed to an error handling routine within the application.

Figure 2:
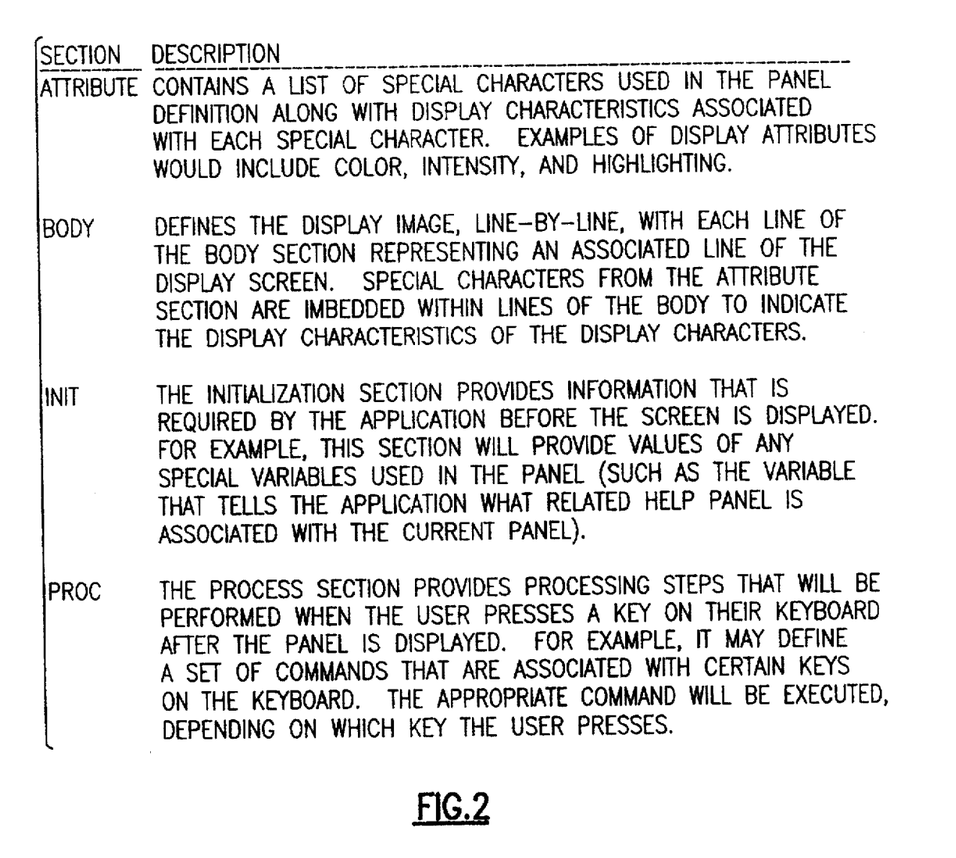
FIG. 2 is the listing of the four sections of an ISPF panel.
Figure 3:
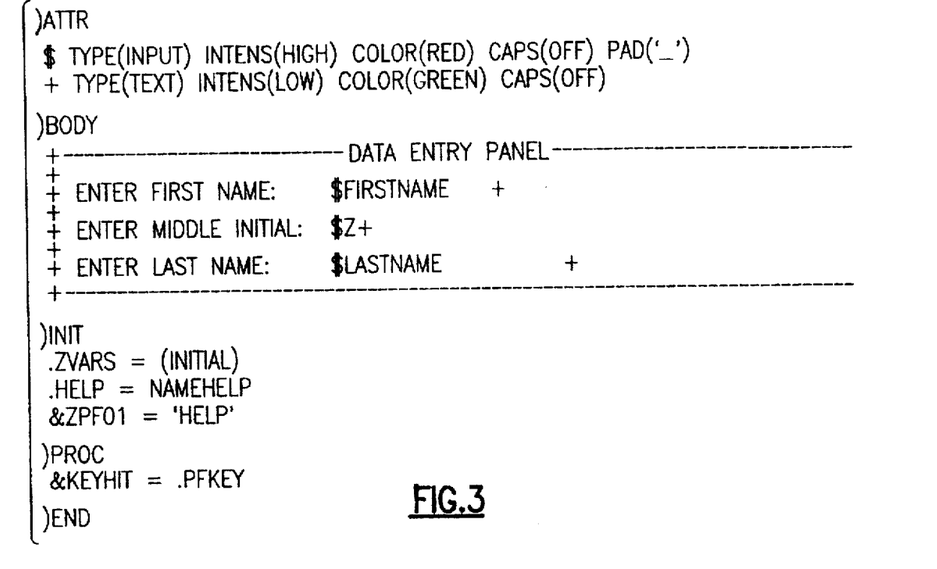
FIG. 3 is a listing of the ISPF panel definition.

Each ISPF panel definition consists of several distinct sections. Each section contains a different type of information required by the runtime component of ISPF when the application executes. The four primary ISPF sections are described in FIG. 2. FIG. 3 provides a simple example of a panel definition in ISPF format, showing the four major sections described in FIG. 2. As shown in FIG. 3, each section of the ISPF panel definition begins with a right parenthesis in position 1 of the line followed by the section name. In this example, two attribute characters are defined in the ATTRIBUTE section. The '$' attribute is defined as an input area on the panel, allowing users to type into the panel area that begins with the '$' attribute. The input attribute is also defined as HIGH intensity, of color RED, with CAPS set to OFF, and with the underscore character defined for padding out the input field. The second attribute character is the '+' symbol, which will define a panel area of type TEXT, with LOW intensity, color GREEN, and CAPS will again be OFF.

The BODY section provides an image of the panel that will be displayed. Imbedded within each line of the panel is one or more of the attribute characters defined previously in the ATTR section. Each attribute character signals the beginning of display characteristics for that position in the line. For INPUT type fields, a variable name is provided in the BODY section. In this example, variables are FIRSTNAME, Z, and LASTNAME. The 'Z' variable is a special ISPF placeholder, used in this example because the input area should be limited to a single character (middle initial). The actual variable name that will be used by the application for this field is defined later in the INIT section.

The INIT section contains three entries in this example. The '.ZVARS' line provides the variable name that will be used for the 'Z' placeholder within the panel BODY. The '.HELP' entry provides the name of a help panel that will be displayed when the user requests help. The '&ZPF01' entry defines the PF1 key as the signal from the user that HELP has been requested.

The PROC section of this example contains a single '&KEYHIT' entry, which will set the variable 'KEYHIT' to the key that the user pressed after the panel was displayed.

Once the panel definition has been extracted in a CMS file format, it can be accessed using standard file I/O tools of VM, specifically the EXECIO command which allows the panel definition to be read into stemmed XEDIT macro variables. Each line of the panel definition file will be assigned to an XEDIT macro stemmed variable, such that the first panel line will be assigned to variable "stem.1", the second panel line will be assigned to variable "stem.2", and so on until the last line of the panel file is assigned.

Figure 4:
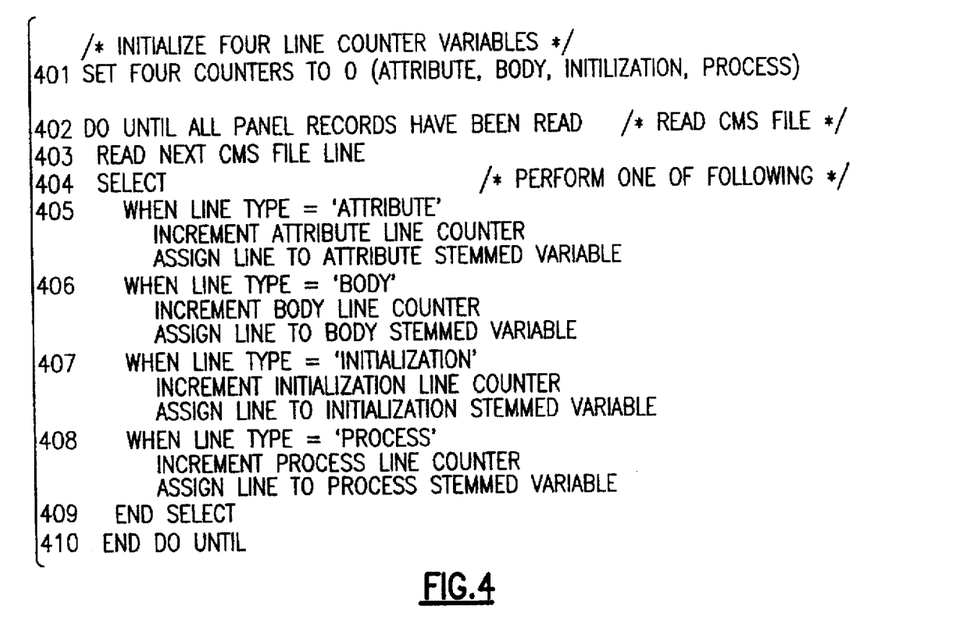
FIG. 4 pseudocode reading of an ISPF panel into stemmed variables.

FIG. 4 contains pseudocode of the process of assigning each line of the ISPF panel definition to an appropriate macro stemmed variable, depending on which section of the ISPF panel the line belongs.

Line 401 of FIG. 4 initializes four line counters to zero, one line counter for each section type within an ISPF panel definition. Lines 402 through 410 comprise a DO-Loop which will read and process each line of the CMS File format of the ISPF panel definition. Lines 404 through 409 represent a select statement that will perform one of four different routines, depending on the type of line that was read from the panel definition file. Line 405 will be processed if the line contains attribute definitions (the attribute line counter will be incremented by one and the panel line will be assigned to the attribute stemmed variable). Line 406 will be processed if the line belongs to the body definition section. Line 407 will be processed if the line belongs to the Initialization section. Line 408 will be processed if the line belongs to the Process section.

After separating the ISPF panel lines into the four separate sections, each section will be processed by the method to interpret the information and convert it into a form that is appropriate for XEDIT. Display attributes from the ATTRIBUTE section will be interpreted and converted into corresponding XEDIT display attributes. Special variables within the INITIALIZATION section, including the definition of an associated HELP panel, will be interpreted and stored for later use by the application. Each command within the PROCESS section will be assigned to an appropriate XEDIT macro variable which represents the PFkey or command code entry that is available to the user when the panel is displayed. The BODY section will be processed last by the disclosed method to perform the actual display of the panel using XEDIT.

Figure 5:
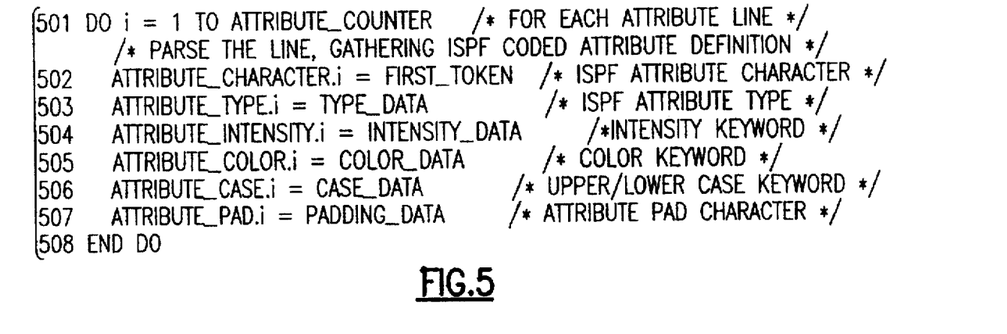
FIG. 5 is a listing of the process attribute section of an ISPF panel.

FIG. 5 provides pseudocode of the processing performed to interpret and convert the display attributes of the ATTRIBUTE section of the ISPF panel definition.

Lines 501 through 508 of FIG. 5 describe a DO-loop that will process each ISPF panel line from the ATTRIBUTE stemmed macro variable created previously. Each line describes a unique attribute character that has been used somewhere within the BODY section of the ISPF panel to indicate the display characteristics of a section of the display panel line. The ISPF display characteristic information is captured in stemmed macro variables by lines 503 through 507 of FIG. 5.

Figure 6:
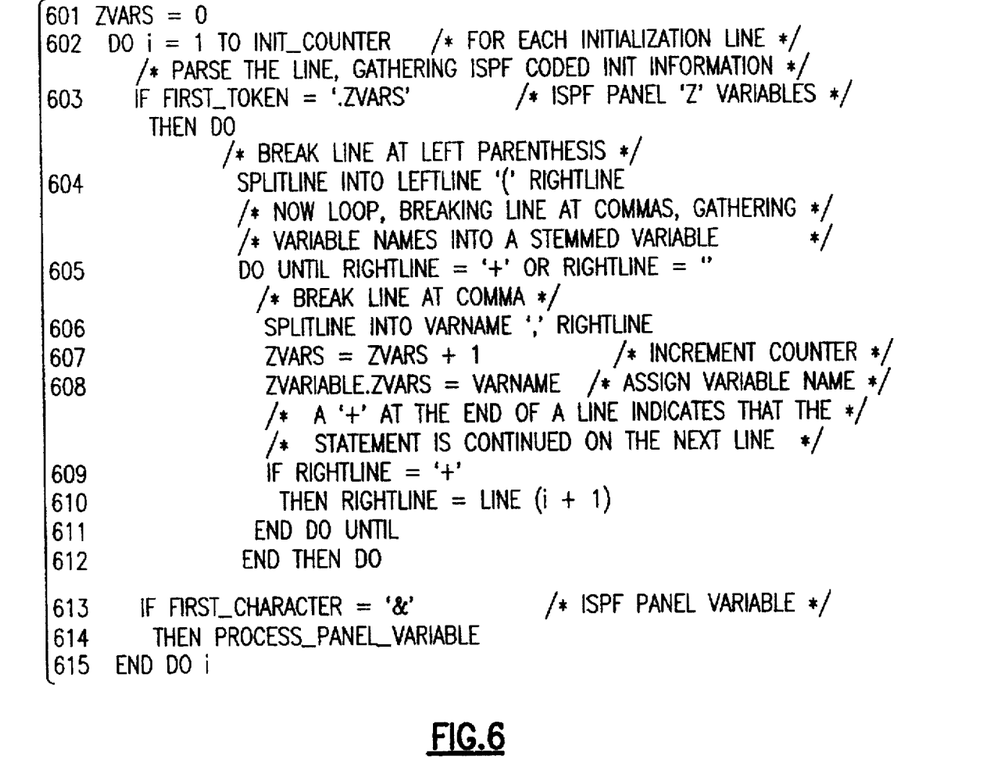
FIG. 6 is a listing of the process initialization section of an ISPF panel.

The pseudocode of FIG. 6 provides the processing flow of the initialization section of the ISPF panel definition. Line 601 will initialize a variable counter to zero. Lines 602 through 615 comprise a DO-Loop that will process each line of the INITIALIZATION stemmed variable (equivalent to the lines contained in the Initialization section of the ISPF panel). Two primary types of information are processed, spacial "ZVARS" statements of ISPF which indicate variable names that map to "Z" placeholders within the panel body, and variable assignments that are made before the panel is displayed.

Lines 603 through 612 will decompose the "ZVARS" statement of any line into a list of variable names that will be stored in a stemmed variable within the XEDIT macro. The line will be iteratively broken into left and right "halves" at each comma within the line. The comma is used by ISPF as a separator between variable names in the list of variables.

Line 604 will split the line at a left parenthesis character, which marks the location of the first variable in the line. Lines 605 through 611 comprise a DO-Loop that will iteratively process the rightmost portion of the line, stripping variable names from the left of the line ending in the comma separator. The DO-Loop will be terminated when the rightmost portion of the line is either NULL or the "+" symbol, which indicates that the statement is continued on the following line. Line 607 will increment the "zvars" counter variable by one, to store the variable name that was previously stripped from the line. Line 608 will assign the variable name to a stemmed variable within XEDIT.

Lines 609 and 610 will check whether the remaining rightmost portion of the line is a "+" symbol, and will assign the following line of the Initialization section to be processed as a continuation of the statement on the previous line.

Lines 613 and 614 of FIG. 6 will check each line for variable assignment statements, with variable names indicated by a preceding ampersand symbol. The ampersand will be stripped off and the variable assignment will be made within XEDIT for use later by the disclosed method.

FIG. 7 provides pseudocode of the disclosed method that will interpret each line of the PROCESS section of the ISPF panel definition, establishing process options available to the user when the panel is displayed.

Lines 701 through 704 of FIG. 7 comprise a Do-Loop that will loop through each line of the PROCESS section of the ISPF panel. Line 702 is an example of the interpretation performed on each line, determining that the line contains a variable assignment that must be transformed into a comparable statement within the XEDIT method.

The BODY section will be processed last by the disclosed method to perform the actual display of the panel using XEDIT. Error message variable names within the panel body will be equated to XEDIT variable names. The special display attributes within each line will be converted to the proper XEDIT attribute commands which were previously allocated when the ATTRIBUTE section was processed. All ISPF variable names will be substituted with XEDIT variable values, and the display image will be padded with leading or trailing characters as required to conform to the ISPF defined display length characteristics.

FIG. 8 provides pseudocode of the processing required for the BODY section of the ISPF panel definition. Line 801 of FIG. 8 initializes a 'ZVAR' counter to zero. This counter will be used to index the stemmed variable which was built previously to contain each special "Z" variable name listed in the INIT section. As the BODY section of the panel definition is interpreted, line-by-line, each "Z" variable encountered within the panel body will be translated into the next variable name within the stemmed variable list.

Lines 802 through 825 comprise a Do-Loop that will process each line of the panel body. The primary task within this loop is to locate ISPF attribute characters within the line and translate them into XEDIT format display attributes. An additional task within this loop is to insert into each line the current value of any variable names located in the line. Special "Z" variable names will also be translated into the appropriate application variable name contained in the list that was built while processing the Initialization section of the panel.

Lines 803 through 824 comprise a DO-Loop that will search the display line for each attribute character which was previously defined in the Attribute section of the panel definition. Line 804 determines the location of a specific attribute within the line. A location of ZERO indicates that the attribute character is not used in the line.

Line 805 will determine the XEDIT compatible attribute character that corresponds to the ISPF attribute character. The XEDIT version will be substituted into the line at a later point in this routine.

Lines 806 through 823 comprise a loop that will execute repeatedly as long as the specific attribute is found somewhere within the line. This routine will split the line into halves at the location of the attribute, and then rebuild the line after substituting the XEDIT form of the attribute character.

Line 807 splits the line into left and right halves at the attribute. The XEDIT attribute character is then added to left haft of the line in statement number 808. Statement numbers 809 through 822 will be executed if the attribute type is INPUT or OUTPUT, signifying that a variable name is contained within the line, beginning immediately after the attribute character.

Line 811 will search the right half of the line for another attribute character, which designates the end of the INPUT or OUTPUT variable name. Line 812 will then calculate the number of characters between the preceding and following attributes, which will indicate the length of the display field when a value is substituted for the variable.

Line 813 will now split the right half of the line at the second attribute character, essentially removing the variable name from the display line. Lines 814 through 818 of FIG. 8 will perform a variable substitution if the variable name within the display line is one of the special "Z" variable placeholders.

Line 819 will obtain the current value within the XEDIT application environment for the variable name that has now been derived from the display line. The value is then padded with the number of pad characters required to extend the length of the display value to equal the number of characters between the two attributes within the panel definition. Line 821 will finally reconstruct the display line by sandwiching the new value field between the left and right halves of the line.

Figure 9:
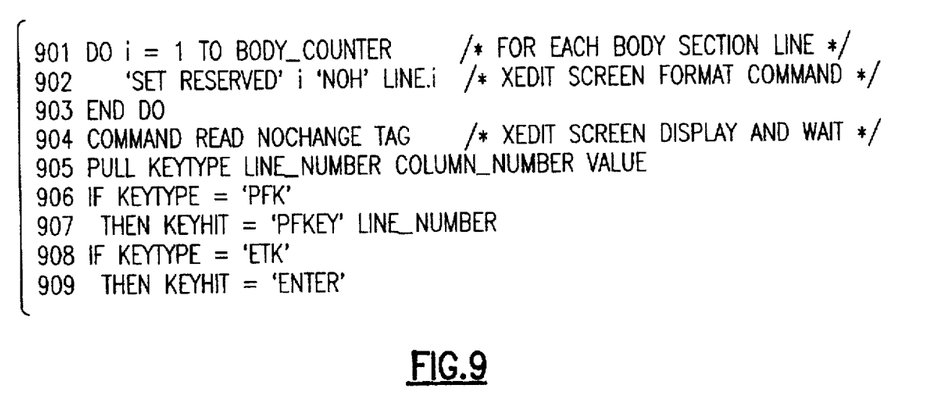
FIG. 9 is a display panel showing using XEDIT.

At this point, the ISPF definition of the display panel has been interpreted and converted into a format that is understood by the REXX language and by the XEDIT display manager. FIG. 9 provides pseudocode of the routine which will display the panel using XEDIT commands within the XEDIT macro environment.

Lines 901 through 903 comprise a DO-Loop that will display each line of the panel, from the top of the screen (line 1) to the bottom (depends on value of Body_counter, which is the number of lines in the ISPF BODY section). Lines 902 executes the XEDIT command "SET RESERVED", which formats the specified line of the display screen. Line 904 is the actual XEDIT command which will display the screen image and wait for a user response.

XEDIT will stack information in the XEDIT program buffer when the user presses an input key or PF key. Line 905 will pull this information from the buffer. Lines 906 and 907 will test whether the user pressed a PF key, and will assign the PFKEY number. Lines 908 and 909 will test whether the user pressed the ENTER key. These results will be passed back to the application, where an appropriate process will be performed depending on the user action.

Figure 11A:
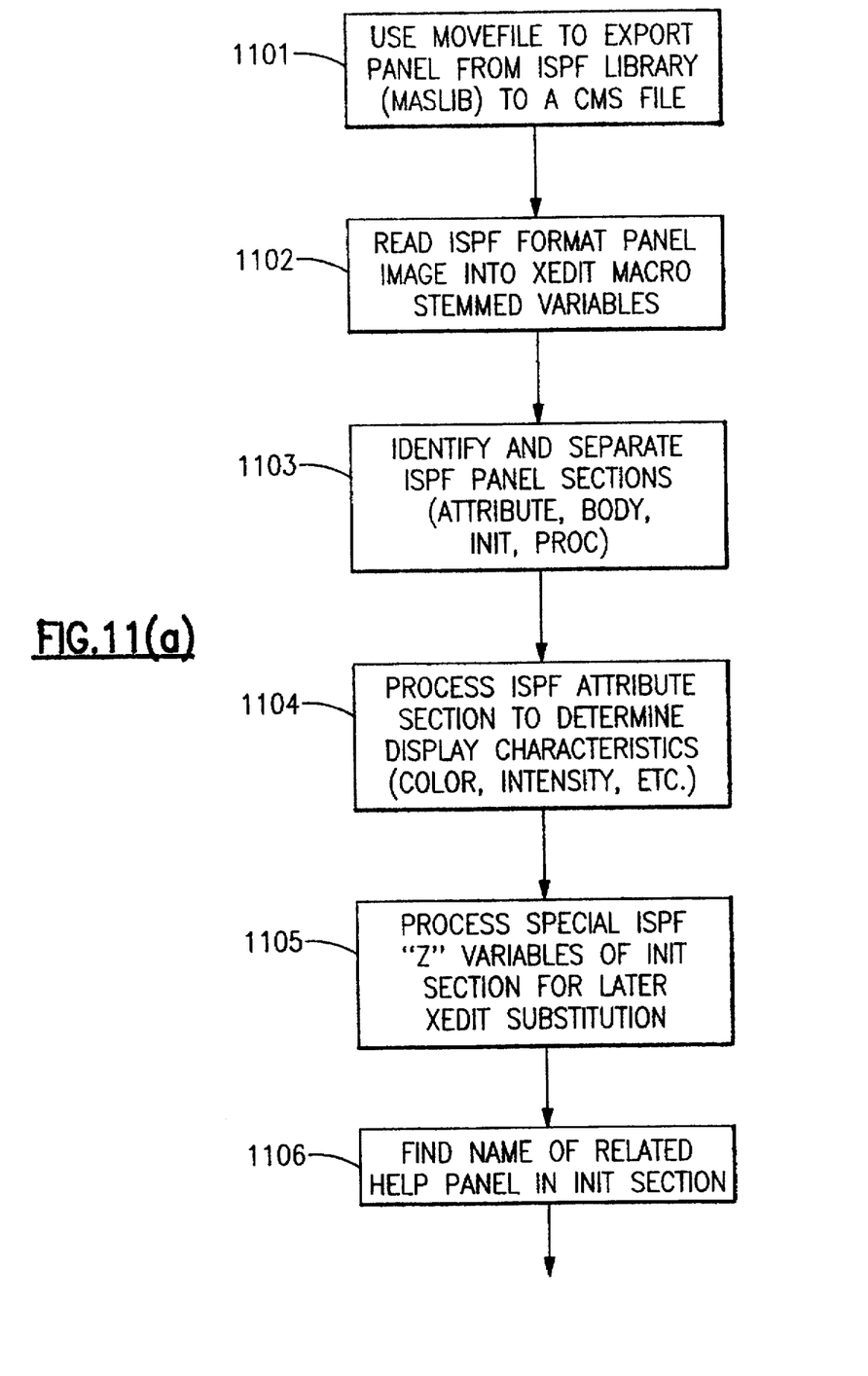
Figure 11B:
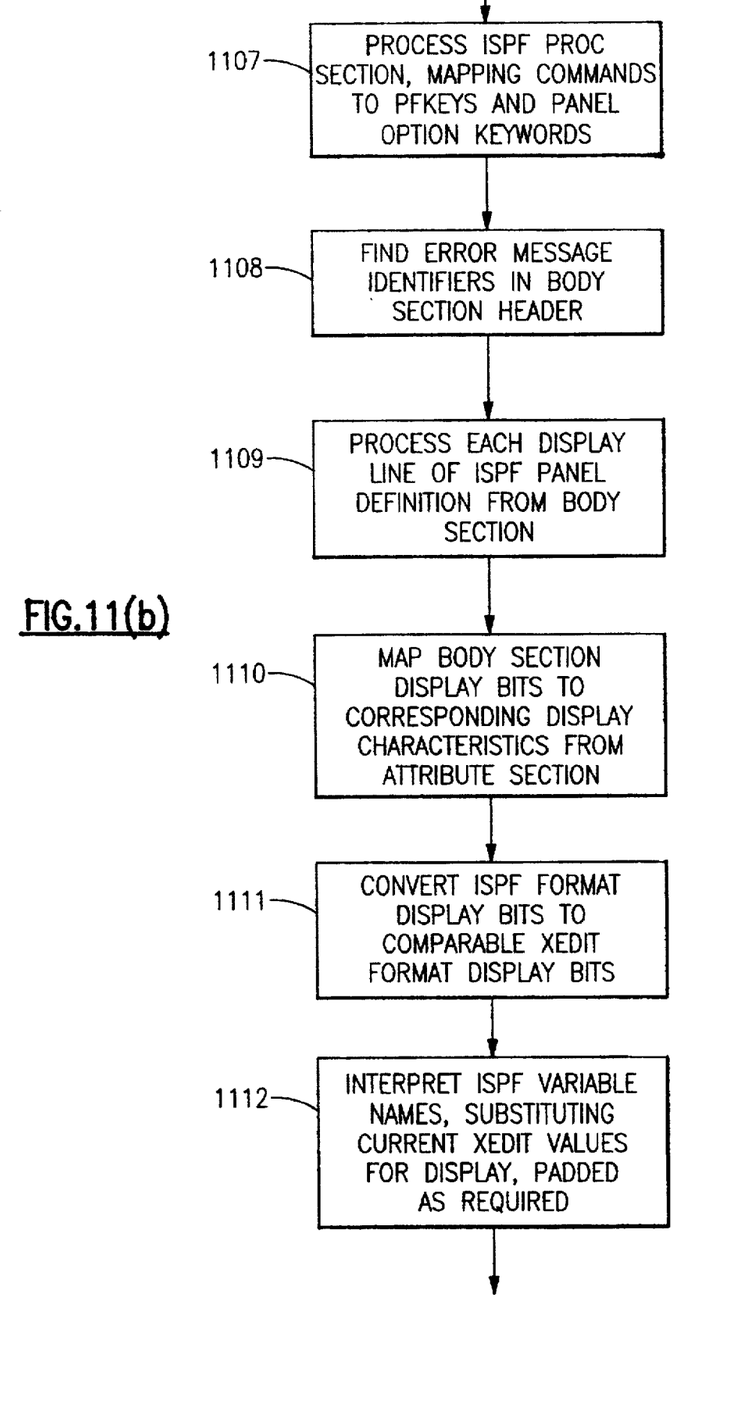
Figure 11C:
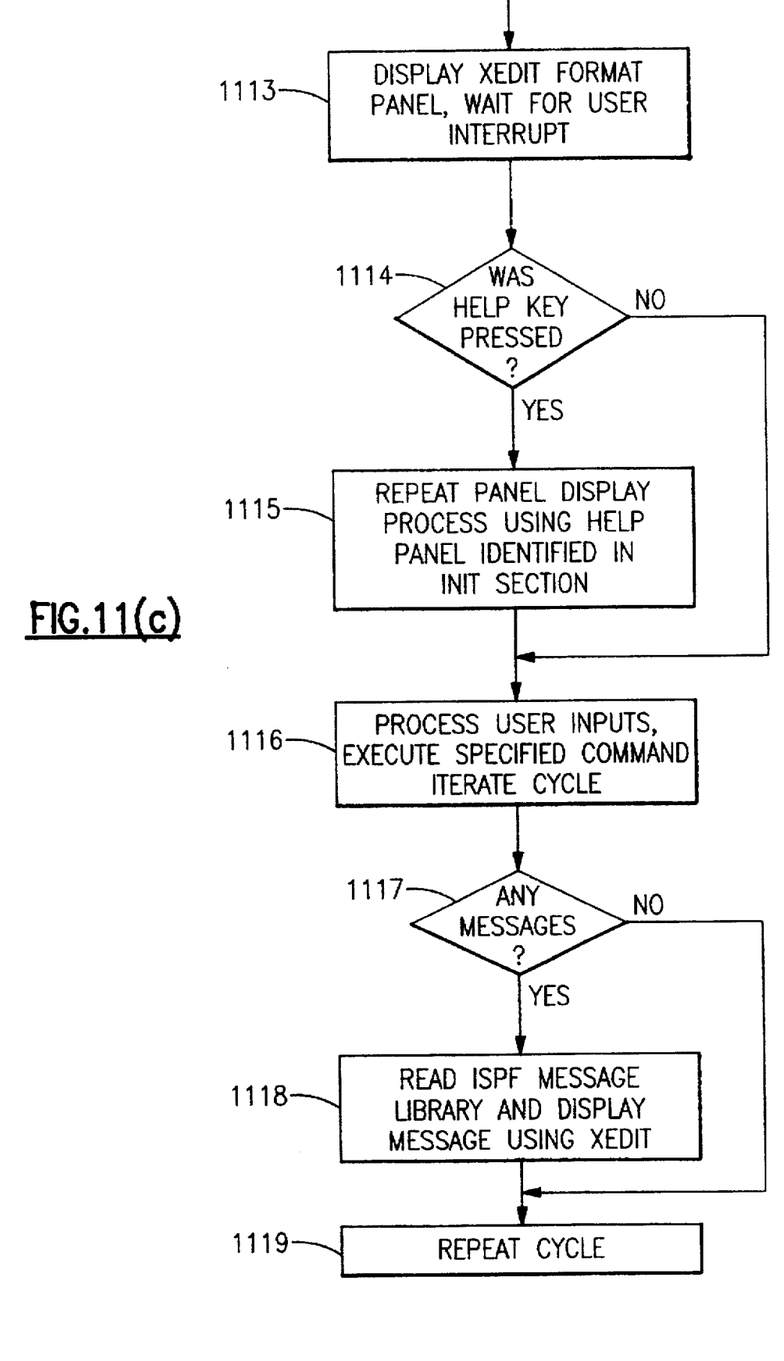

After performing the requested action, the disclosed method will repeat the panel display process, either with the same panel or a new panel, depending on the process flow of the invoking application. The process flow is shown in FIGS. 11 a, b and c which is a flow diagram of the inventive process as discussed above starting with step 1101 to step 1119.

Figure 10:
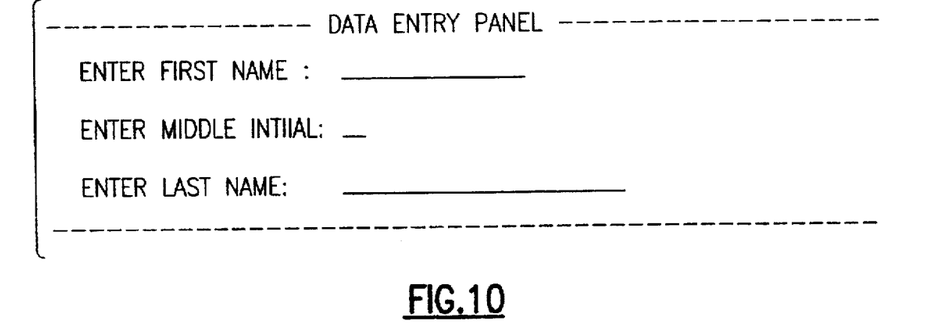
FIG. 10 an example output using the present method.

If the disclosed method were applied to the ISPF panel definition shown in FIG. 3, the resulting screen display would be similar to that shown in FIG. 10. Colors and highlighting would be displayed according to the definitions given in the ISPF attribute section of FIG. 3.

The three "underscore" areas of FIG. 10 would be displayed in RED, and would be HIGHLIGHTED, while all other characters in the display screen would be GREEN and would be displayed in NORMAL intensity. The user would be able to type entries within the three "underscore" areas of the screen, but would be prohibited from typing in any other area of the screen.

The REXX language and the XEDIT display manager were chosen for the described implementation, due to their ready availability within the VM Operating System environment and their ease of use to implement the described algorithm. Any other compiled language available in the VM environment could also be used to implement this algorithm (including COBOL, FORTRAN, or PL1), although implementation would not be nearly as portable since the necessary compilers may not be available on all VM systems.

The described algorithm processed each of the four sections of the ISPF panel definition (Attribute, Initialization, Process, Body) before the screen was displayed to the user. These sections could be processed in various other sequences. For example, another implementation could choose to display the panel and wait for a user input before scanning and interpreting the Process section. By delaying the interpretation of the Process section until after the panel is displayed, the panel display may be slightly faster, but the response time after the user presses a key would be proportionately longer since the interpretation would be incurred at that time.

What is claimed:

1. In a data processing system having a display device connected to a central processor, said central processor being capable of retrieving from storage a selected display panel definition specifying the layout of a display panel for display by said display device, said display panel definition being stored in a first data format compatible with a first display program, a method of displaying said display panel using a second display program resident on said central processor, said first data format being incompatible with said second display program, said method being operable at run time and comprising the steps of:

retrieving said selected display panel definition from storage;

converting the retrieved display panel definition from said first data format into a second data format, said second data format specifying the same layout as said first data format but being compatible with said second display program; and displaying the display panel represented by the converted display panel definition on said display device using said second display program.

2. The method of claim 1 wherein said first display program is ISPF.

3. The method of claim 1 wherein said second display program is XEDIT.

4. The method of claim 1 wherein said display panel definition is selected from a display panel library containing a plurality of display panel definitions.

5. The method of claim 1 wherein said central processor has a VM operating system running thereon.

6. In a data processing system having a display device connected to a central processor, said central processor being capable of retrieving from storage a selected display panel definition specifying the layout of a display panel for display by said display device, said display panel definition being stored in a first data format compatible with a first display program, apparatus for displaying said display panel using a second display program resident on said central processor, said first data format being incompatible with said second display program, said apparatus being operable at run time and comprising:

means for retrieving said selected display panel definition from storage;

means for converting the retrieved display panel definition from said first data format into a second data format, said second data format specifying the same layout as said first data format but being compatible with said second display program; and means displaying the display panel represented by the converted display panel definition on said display device using said second display program.

7. The apparatus of claim 6 wherein said first display program is ISPF.

8. The apparatus of claim 6 wherein said second display program is XEDIT.

9. The apparatus of claim 6 wherein said display panel definition is selected from a display panel library containing a plurality of display panel definitions.

10. The apparatus of claim 6 wherein said central processor has a VM operating system running thereon.

11. In a data processing system having a display device connected to a central processor, said central processor being capable of retrieving from storage a selected display panel definition specifying the layout of a display panel for display by said display device, said display panel definition being stored in an ISPF data format, a method of displaying said display panel using a non-ISPF display program resident on said central processor, said ISPF data format being incompatible with said second display program, said method being operable at run time and comprising the steps of:

retrieving said selected display panel definition from storage;

converting the retrieved display panel definition from said ISPF data format into a second data format, said second data format specifying the same layout as said ISPF data format but being compatible with said non-ISPF display program; and displaying the display panel represented by the converted display panel definition on said display device using said second display program.

12. The method of claim 1 wherein said first program is executable on said central processor.

13. The apparatus of claim 6 wherein said first program is executable on said central processor.

* * * * *